United States Patent
Ryan et al.

(10) Patent No.: US 9,338,706 B2
(45) Date of Patent: May 10, 2016

(54) METHOD FOR AUTOMATED NEIGHBOR LIST INITIALIZATION IN A CELLULAR NETWORK

(71) Applicant: Eden Rock Communications, LLC, Bothell, WA (US)

(72) Inventors: Dave James Ryan, Bothell, WA (US); Anthony Keng-San Wong, Bothell, WA (US)

(73) Assignee: Nokia Solutions and Networks OY, Espoo (FI)

( * ) Notice: Subject to any disclaimer, the term of this patent is extended or adjusted under 35 U.S.C. 154(b) by 0 days.

(21) Appl. No.: 14/033,309

(22) Filed: Sep. 20, 2013

(65) Prior Publication Data

US 2014/0213257 A1    Jul. 31, 2014

Related U.S. Application Data

(60) Provisional application No. 61/757,660, filed on Jan. 28, 2013.

(51) Int. Cl.
    *H04W 36/00*    (2009.01)
(52) U.S. Cl.
    CPC ................. *H04W 36/0083* (2013.01)
(58) Field of Classification Search
    CPC .................................. H04W 36/0083
    USPC ........................................ 455/436
    See application file for complete search history.

(56) References Cited

U.S. PATENT DOCUMENTS

| 8,649,791 B1 * | 2/2014 | Wohld .............. H04W 36/0083 455/446 |
| 2009/0005052 A1 * | 1/2009 | Abusch-Magder et al. .. 455/446 |
| 2010/0003980 A1 * | 1/2010 | Rune et al. .................... 455/436 |
| 2010/0322107 A1 * | 12/2010 | Nagano ............. H04W 36/0083 370/254 |
| 2011/0070883 A1 * | 3/2011 | Wang .................... H04W 16/10 455/424 |
| 2011/0130144 A1 * | 6/2011 | Schein .................... H04L 41/12 455/442 |
| 2011/0244858 A1 * | 10/2011 | Callender ......... H04W 36/0055 455/436 |
| 2012/0122478 A1 | 5/2012 | Siomina et al. |
| 2012/0314604 A1 | 12/2012 | Siomina et al. |
| 2014/0073306 A1 * | 3/2014 | Shetty .............. H04W 36/0088 455/418 |

FOREIGN PATENT DOCUMENTS

| GB | 2372173 A * | 8/2002 | ............... H04Q 7/36 |
| WO | WO 2005/032190 A1 | 4/2005 | |
| WO | WO 2009/022967 A2 | 2/2009 | |
| WO | WO 2011/022731 A1 | 2/2011 | |

OTHER PUBLICATIONS

International Search Report and Written Opinion for PCT/US2013/067625, filed Oct. 30, 2013.

* cited by examiner

*Primary Examiner* — Marisol Figueroa
*Assistant Examiner* — Jean Chang

(57) ABSTRACT

Automated initialization of a neighbor list for a target cell may include determining one or more donor cell from among a plurality of candidate cells, and creating a neighbor list for the target cell based on one or more neighbor list of the one or more donor cell. A donor cell may be a co-site cell, or otherwise identified based on location, technology, coverage, and other characteristics. The neighbor list of the donor cell is used to initialize the neighbor list of the target cell, which may be refined through subsequent processing.

19 Claims, 9 Drawing Sheets

# METHOD FOR AUTOMATED NEIGHBOR LIST INITIALIZATION IN A CELLULAR NETWORK

CROSS-REFERENCES TO RELATED APPLICATIONS

The present invention claims priority to U.S. Provisional Application No. 61/757,660, filed Jan. 28, 2013, which is incorporated by reference herein for all purposes.

BACKGROUND OF THE INVENTION

Wireless networks rely on a large number of individual base stations to provide high capacity wireless services over large coverage areas such as market areas (e.g. cities), surrounding residential areas (e.g. suburbs, counties), highway corridors and rural areas. Continuous radio connectivity across these large coverage areas is accomplished via user mobility from one base station to others as the user traverses the network's operating area. High reliability mobility is an essential aspect of mobile wireless networks in order to minimize the number of dropped calls or other abnormal discontinuation of radio service to the supported users.

A key feature of all modern multi-base station mobility networks is the creation and maintenance of Neighbor Lists for each base station within the network. Each base station transmits its list of nearby neighbor cells to mobile devices such that a mobile device can continuously monitor the radio frequencies defined in the list and search for higher quality base stations to which it may handover if and when the mobile device experiences degraded signal quality from its current serving radio base station. During active call sessions the mobile device continually monitors the quality of its serving base station and scans the defined frequency and or scrambling code combinations defined on its current neighbor list searching for suitable quality candidates.

Automated Neighbor Relations (ANR) processes facilitate ongoing neighbor list management by evaluating historical performance reports and adding, deleting or reprioritizing list neighbors accordingly. However, ANR processes may require the existence of an initial neighbor list at each wireless base station containing at least one valid nearby neighbor. This requirement to have some initial provisioning of neighbor lists prior to running ongoing neighbor list optimization algorithms presents a challenge when new cells are added to an existing network. Conventionally, the original neighbor list at each newly added cell is determined through a manual planning processes prior to the execution of any automated ANR processing.

BRIEF SUMMARY OF THE INVENTION

Embodiments of the present invention include a method and system to facilitate automated initial neighbor list population for new wireless cells added to existing networks. An embodiment utilizes known characteristics of each newly added wireless cell to determine proximity and coverage area correlation to nearby cells to locate co-located or adjacent cells with a high probability of common neighbors to the newly added cells. The neighbor lists for these high probability nearby neighbors are automatically retrieved, remapped as necessary, and loaded to the new cell as its initial neighbor list. Subsequent ANR processing is then relied upon for ongoing neighbor list optimization.

An embodiment of a system for initializing a neighbor list for a target cell includes a processor, a memory, and a non-transitory computer readable medium with computer executable instructions stored thereon which, when executed by the processor, determine one or more donor cell from among a plurality of candidate cells, and create a neighbor list for the target cell based on one or more neighbor list of the one or more donor cell.

In an embodiment, determining one or more donor cell may include defining a geographical area based on the location of the target cell, and designating a plurality of cells within the geographical area as candidate cells. In addition or as an alternative, determining the one or more donor cell may include determining whether each of the plurality of candidate cells is co-site located with the target cell, and for each co-site located candidate cell, comparing a boresight azimuth of an antenna associated with the co-site candidate cell to a boresight azimuth of an antenna associated with the target cell. In addition or as an alternative, determining the one or more donor cell may include determining coverage areas of a plurality of candidate cells and comparing the coverage areas of the plurality of candidate cells to a coverage area of the target cell. In addition or as an alternative, determining the one or more donor cell may include comparing communications technology of each of the plurality of candidate cells to a communication technology of the target cell.

In an embodiment, creating the neighbor list for the target cell may include determining whether the one or more donor cell uses a same communications technology as the target cell, and when the one or more donor cell uses a different communications technology from the target cell, remapping contents of the donor cell's neighbor list in accordance with the communications technology of the target cell. Creating the neighbor list for the target cell may include determining whether the one or more donor cell uses a same carrier frequency as the target cell, and when the one or more donor cell uses a different carrier frequency from the target cell, remapping contents of the one or more neighbor list of the one or more donor cell in accordance with the technology of the target cell. Remapping the contents of the one or more neighbor list of the one or more donor cell may include re-mapping data for inter-cell neighbors with data for intra-cell neighbors.

In an embodiment, the one or more donor cell includes a plurality of cells, and creating the neighbor list for the target cell includes combining information from each neighbor list of the plurality of donor cells.

In an embodiment, determining the one or more donor cell may include defining a geographical area based on the location of the target cell, designating a plurality of cells within the geographical area as candidate cells, determining whether each of the plurality of candidate cells is co-site located with the target cell, for each co-site located candidate cell, comparing a boresight azimuth of an antenna associated with the co-site candidate cell to a boresight azimuth of an antenna associated with the target cell, determining coverage areas of the plurality of candidate cells, comparing the coverage areas of the plurality of candidate cells to a coverage area of the target cell, and comparing communications technology of each of the plurality of candidate cells to a communication technology of the target cell.

In an embodiment, determining the one or more donor cell and creating the neighbor list for the target cell are performed when the system detects that a new cell is added to the system, when the target cell is repurposed to use a different set of frequencies, or when the coverage area of the target cell is changed.

DETAILED DESCRIPTION OF THE INVENTION

Figure 1:
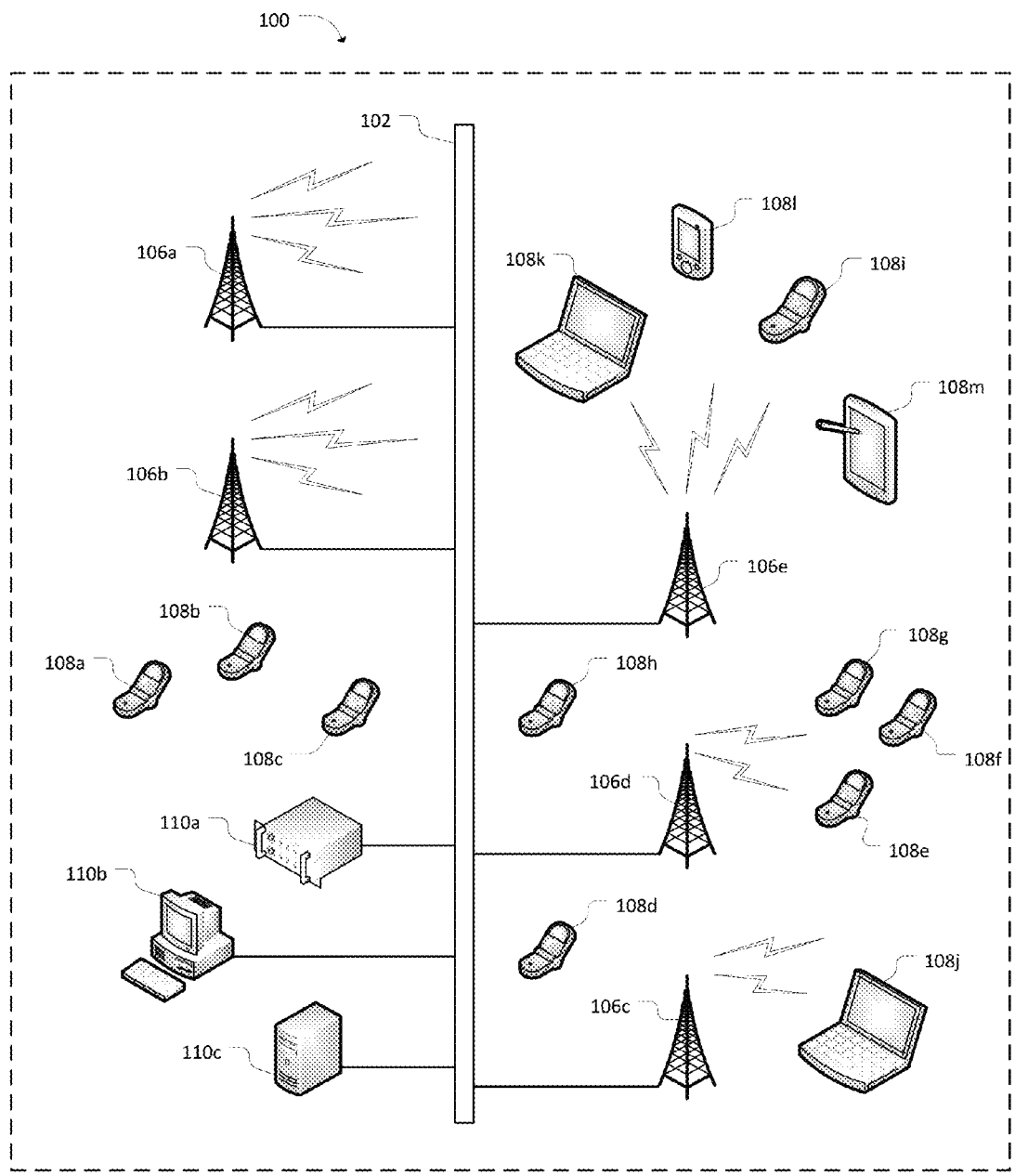
FIG. 1 illustrates a system according to an embodiment.

In the following detailed description, reference is made to the accompanying drawings, which form a part of the description. The example embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of embodiments is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

FIG. 1 illustrates an example networked computing system 100 according to an embodiment of this disclosure. As depicted, system 100 includes a data communications network 102, one or more base stations 106a-e, one or more network resource controller 110a-c, and one or more User Equipment (UE) 108a-m. As used herein, the term "base station" refers to a wireless communications station provided in a location and serves as a hub of a wireless network. The base stations may be used with macrocells, microcells, picocells, and femtocells.

In a system 100 according to an embodiment of the present invention, the data communications network 102 may include a backhaul portion that can facilitate distributed network communications between any of the network controller devices 110a-c and any of the base stations 106a-e. Any of the network controller devices 110a-c may be a dedicated Network Resource Controller (NRC) that is provided remotely from the base stations or provided at the base station. Any of the network controller devices 110a-c may be a non-dedicated device that provides NRC functionality among others. The one or more UE 108a-m may include cell phone devices 108a-i, laptop computers 108j-k, handheld gaming units 108l, electronic book devices or tablet PCs 108m, and any other type of common portable wireless computing device that may be provided with wireless communications service by any of the base stations 106a-e.

As would be understood by those skilled in the art, in most digital communications networks, the backhaul portion of a data communications network 102 may include intermediate links between a backbone of the network which are generally wire line, and sub networks or base stations 106a-e located at the periphery of the network. For example, cellular user equipment (e.g., any of UE 108a-m) communicating with one or more base stations 106a-e may constitute a local sub network. The network connection between any of the base stations 106a-e and the rest of the world may initiate with a link to the backhaul portion of an access provider's communications network 102 (e.g., via a point of presence).

In an embodiment, an NRC has presence and functionality that may be defined by the processes it is capable of carrying out. Accordingly, the conceptual entity that is the NRC may be generally defined by its role in performing processes associated with embodiments of the present disclosure. Therefore, depending on the particular embodiment, the NRC entity may be considered to be either a hardware component, and/or a software component that is stored in computer readable media such as volatile or non-volatile memories of one or more communicating device(s) within the networked computing system 100.

In an embodiment, any of the network controller devices 110a-c and/or base stations 106a-e may function independently or collaboratively to implement processes associated with various embodiments of the present disclosure. Further, processes for creating a neighbor list may be carried out via any common communications technology known in the art which employ neighbor lists, such as those associated with modern Global Systems for Mobile (GSM), Universal Mobile Telecommunications System (UMTS), Long Term Evolution (LTE) network infrastructures, etc.

In accordance with a standard GSM network, any of the network controller devices 110a-c (NRC devices or other devices optionally having NRC functionality) may be associated with a base station controller (BSC), a mobile switching center (MSC), or any other common service provider control device known in the art, such as a radio resource manager (RRM). In accordance with a standard UMTS network, any of the network controller devices 110a-c (optionally having NRC functionality) may be associated with a NRC, a serving GPRS support node (SGSN), or any other common network controller device known in the art, such as an RRM. In accordance with a standard LTE network, any of the network controller devices 110a-c (optionally having NRC functionality) may be associated with an eNodeB base station, a mobility management entity (MME), or any other common network controller device known in the art, such as an RRM.

In an embodiment, any of the network controller devices 110a-c, the base stations 106a-e, as well as any of the UE 108a-m may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. Any of the network controller devices 110a-c, or any of the base stations 106a-e may employ any number of common server, desktop, laptop, and personal computing devices.

In an embodiment, any of the UE 108a-m may be associated with any combination of common mobile computing devices (e.g., laptop computers, tablet computers, cellular phones, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

In an embodiment, the backhaul portion of the data communications network 102 of FIG. 1 may employ any of the following common communications technologies: optical fiber, coaxial cable, twisted pair cable, Ethernet cable, and power-line cable, along with any other wireless communication technology known in the art. In context with various embodiments of the invention, it should be understood that wireless communications coverage associated with various data communication technologies (e.g., base stations 106a-e) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
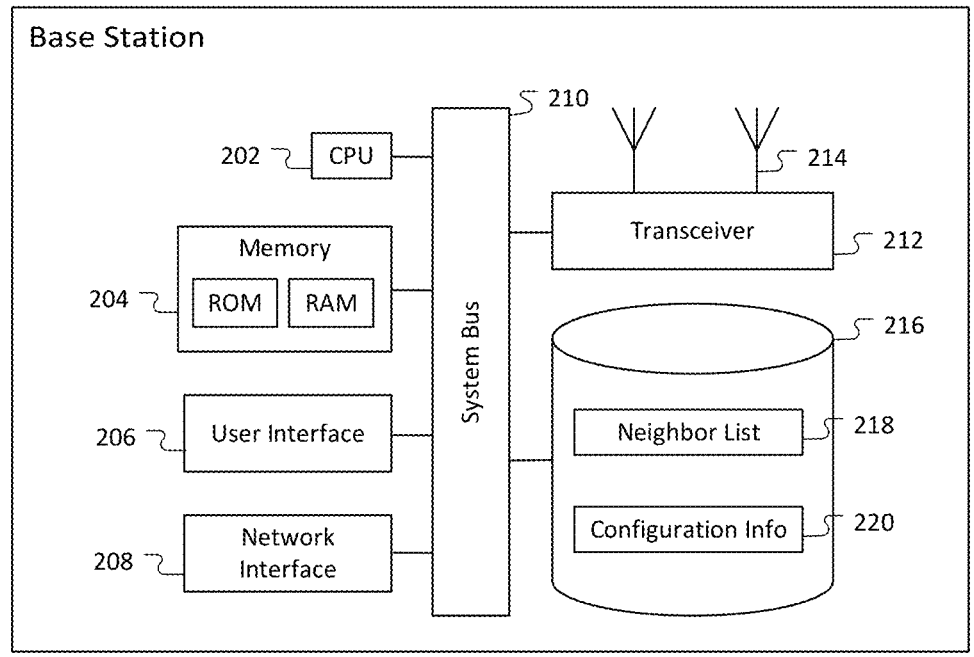
FIG. 2 illustrates a network resource controller according to an embodiment.

FIG. 2 illustrates a block diagram of a base station 200 (e.g., a femtocell, picocell, microcell or macrocell) that may be representative of the base stations 106a-e in FIG. 1. In an embodiment, the base station 200 includes at least one central processing unit (CPU) 202. The CPU 202 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 202 is responsible for executing computer programs stored on volatile (RAM) and nonvolatile (ROM) system memories 204.

Base station 200 may include a user interface 206 for inputting and retrieving data to and from the base station by operator personnel, and a network interface coupled to a wireline portion of the network. In an embodiment, the base station 200 may send or receive a neighbor list and other information to or from an NRC. Meanwhile, base station 200 wirelessly sends and receives information to and from UE through transceiver 212, which is equipped with one or more antenna 214.

The base station 200 may further include a system bus 210 and data storage 216. The system bus facilitates communication between the various components of the base station. For example, system bus 210 may facilitate communication between a program stored in data device 216 and CPU 202 which executes the program. In an embodiment, data storage 216 may store a neighbor list 218 and configuration information 220. In addition, data storage 216 may include an operating system, and various programs related to the operation of the base station 200.

In various embodiments, the base station 200 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, etc.) to send and receive information to and from UE through transceiver 212. Additionally, the base station 200 may be configured to communicate with UEs 108a-m via any Cellular Data Communications Protocol, including any common GSM, UMTS, WiMAX or LTE protocol.

Figure 3:
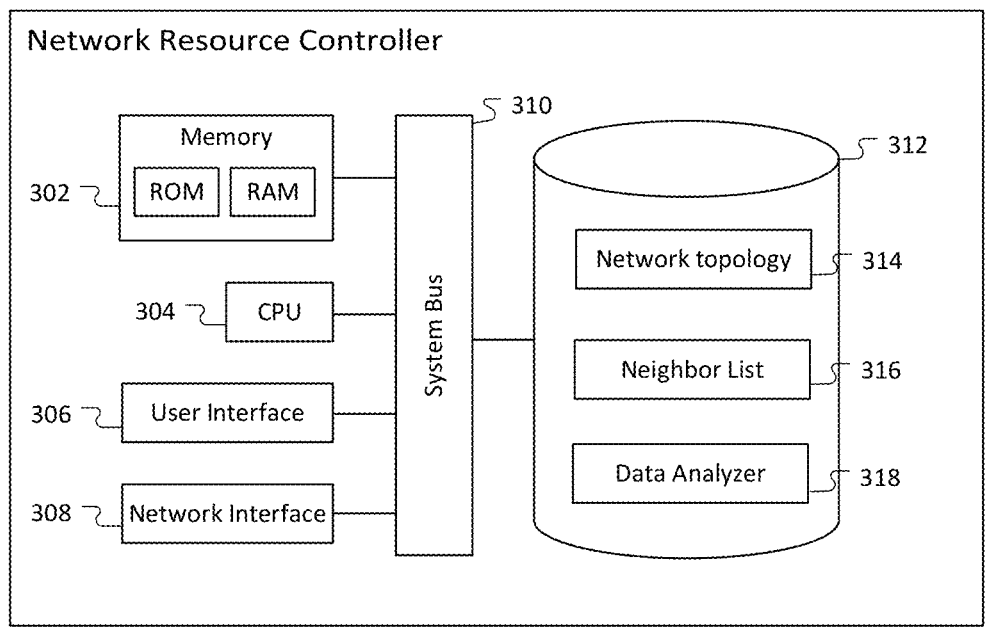
FIG. 3 illustrates a base station according to an embodiment.

FIG. 3 illustrates a block diagram of an NRC 300 that may be representative of any of the network controller devices 110a-c. In an embodiment, one or more of the network controller devices 110a-c are SON controllers. The NRC 300 includes one or more processor devices including a central processing unit (CPU) 304. The CPU 304 may include an arithmetic logic unit (ALU) (not shown) that performs arithmetic and logical operations and one or more control units (CUs) (not shown) that extracts instructions and stored content from memory and then executes and/or processes them, calling on the ALU when necessary during program execution.

The CPU 304 is responsible for executing computer programs stored on volatile (RAM) and nonvolatile (ROM) memories 302 and a storage device 312 (e.g., HDD or SSD). In some embodiments, storage device 312 may store program instructions as logic hardware such as an ASIC or FPGA. Storage device 312 may include network topology information 314, neighbor list information 316, and data analyzer 318. Data analyzer 318 may include program information for executing one or more form of data analysis described below, such as identifying candidate cells within a geographical area.

The NRC 300 may also include a user interface 306 that allows an administrator to interact with the NRC's software and hardware resources and to display the performance and operation of the networked computing system 100. In addition, the NRC 300 may include a network interface 308 for communicating with other components in the networked computer system, and a system bus 310 that facilitates data communications between the hardware resources of the NRC 300.

In addition to the network controller devices 110a-c, the NRC 300 may be used to implement other types of computer devices, such as an antenna controller, an RF planning engine, a core network element, a database system, or the like. Based on the functionality provided by an NRC, the storage device of such a computer serves as a repository for software and database thereto.

Embodiments of the present invention relate to initiating a neighbor list. As referred to herein, the term "cell" refers to a carrier frequency and wireless resources for a particular radio access technology (RAT) that are transmitted and received via a base station antenna. A cell has a coverage area defined by the antenna orientation and the transmit power assigned to the carrier frequency for that cell. Examples of RATs include GSM (2G), UMTS (3G), and LTE (4G). An antenna may transmit and receive information for one or more cells, each associated with a different carrier frequency. A neighbor list may be initialized when a cell is activated for the first time at a base station, when a current cell is repurposed to use a different set of frequencies, when the coverage area of a cell changes, or when a cell is converted to supported a different RAT, etc.

Figure 4:
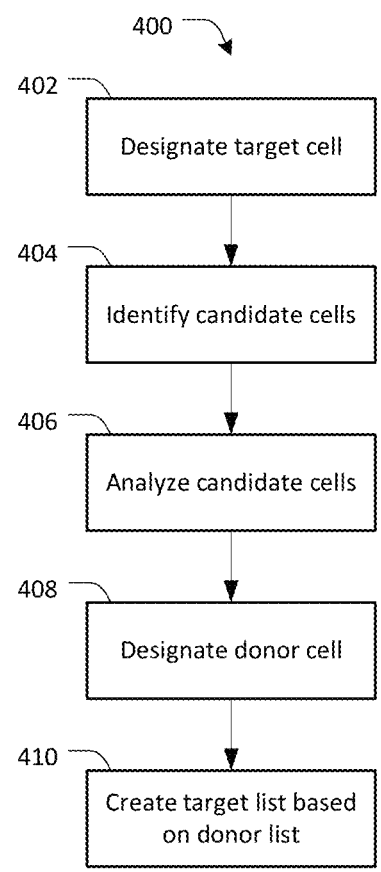
FIG. 4 illustrates a process for determining a neighbor list for a target cell according to an embodiment.

FIG. 4 illustrates a process of initializing a neighbor list for a cell. In step 402, a target cell is designated. The target cell is the cell for which a new neighbor list is initialized. In an embodiment, designating the target cell may include receiving and storing information regarding the target cell at an entity such as an NRC for subsequent analysis. The information may include geographical coordinates for cell coverage area and antenna location, antenna geometry such as azimuth and downtilt, carrier frequencies, and RAT. Such information may be referred to as network topology for a cell.

In step 404, candidate donor cells of the target cell are identified. Characteristics of the candidate cells are subsequently analyzed in step 406 in order to determine a donor cell. A donor cell is a cell whose neighbor list will be used to initialize the neighbor list of the target cell. The donor cell is an existing operational cell with a functioning neighbor list but not necessarily transmitting on the same carrier frequency, transmitting within the same operating band, or even utilizing the same RAT. In step 408, a donor cell is designated based on the results of the analysis, and a neighbor list is created for the target cell based on a neighbor list of the donor cell in step 410.

Figure 5:
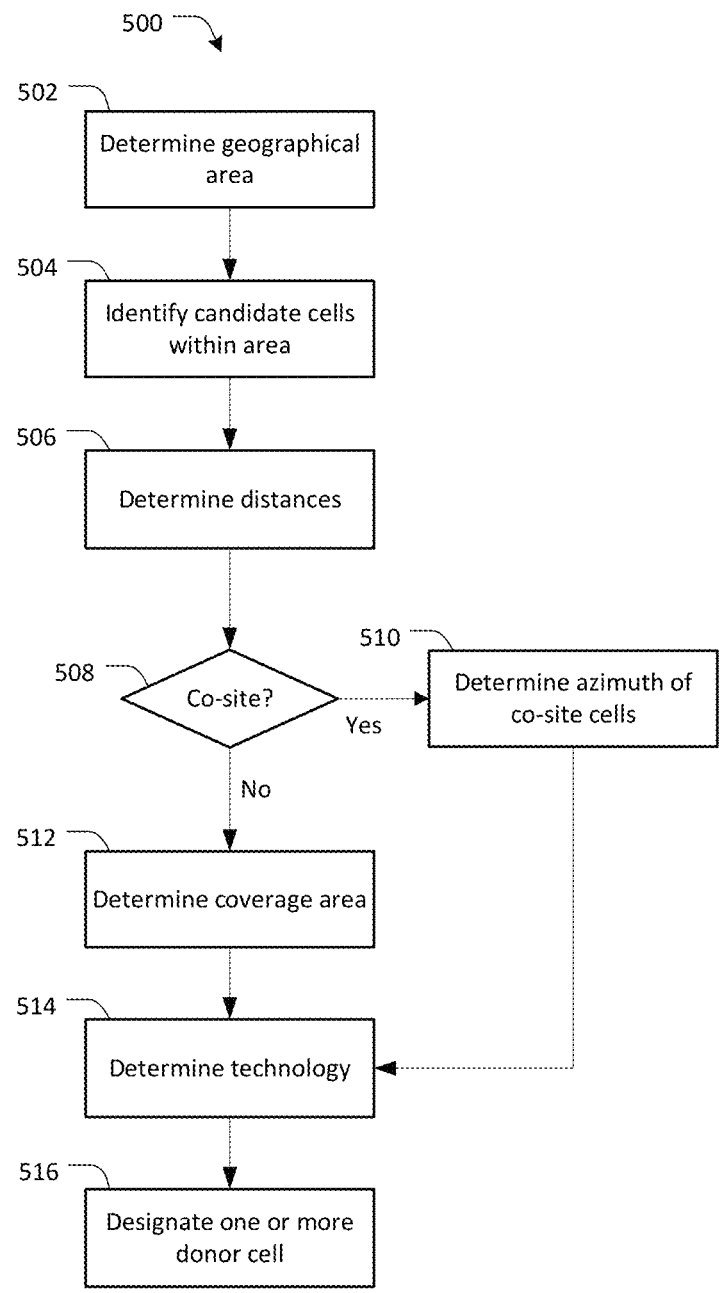
FIG. 5 illustrates a process for determining a donor cell according to an embodiment.

FIG. 5 shows a process 500 of determining a donor cell. Aspects of process 500 correspond to steps 404 to 408 of FIG. 4. Steps of process 500 include gathering and analyzing information including distance, azimuth, coverage area, and technology, in order to designate a donor cell in step 516.

A geographical area is determined with respect to the target cell in step 502. Determining a geographical area may include selecting a predetermined distance, and using the predetermined distance to establish a geographical area about the target cell. The predetermined distance may be set manually or automatically.

In an embodiment in which it is set automatically, the predetermined distance may be derived from statistical inter-site distances representative of the network under consideration. For example, an automatic predetermined distance may be a percentage of the mean inter-site distance utilized across a region. The predetermined distance can then be used to establish a geographic area about the target cell, and cells within the geographic area may be designated as candidate cells. Candidate cells are cells that are candidates for being designated as a donor cell.

Figure 6:
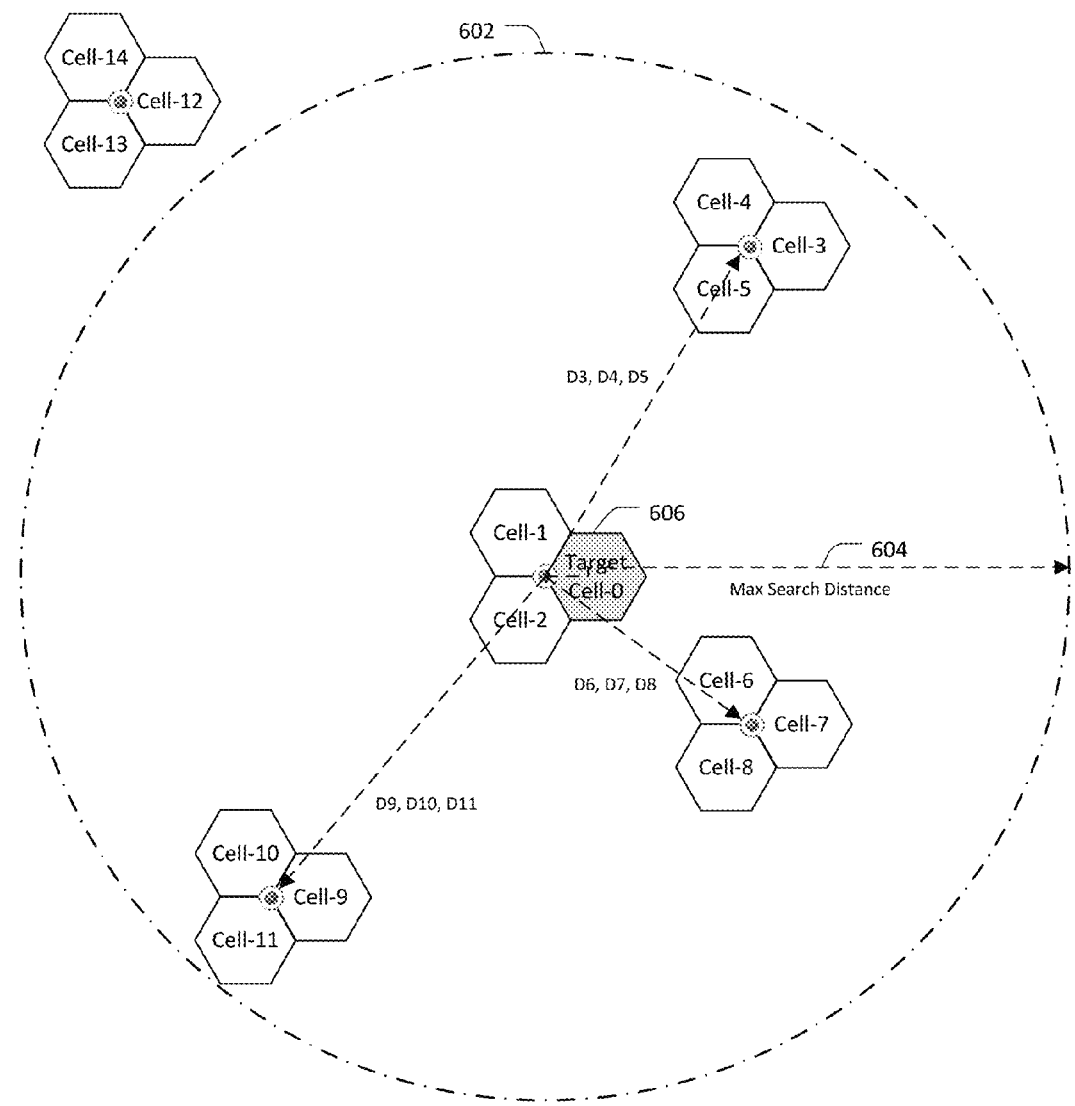
FIG. 6 illustrates identifying candidate cells based on geography according to an embodiment.

FIG. 6 illustrates an example of determining a geographical area 602. As seen in FIG. 6, a predetermined distance 604 is established with respect to target cell 606. In the embodiment shown in FIG. 6, the distance 604 is used as a radius to establish a circular area with the antenna for the target cell as the center. However, in other embodiments, the predetermined distance can be used to establish an area of any geometry about the target cell. For example, the predetermined distance can be used to establish rectangular coordinates in the form of minimum and maximum latitude and longitude.

After a geographical area has been identified, in step 504 candidate cells are identified within the geographical area. The locations of candidate cells may be determined by searching stored network topology information of the cellular system. In the example of FIG. 6, Cell-12, Cell-13, and Cell-14 and any other cells beyond the illustrated area 602 are not considered candidates for neighbor list initialization. Cells 0 through 11 satisfy the initial search distance criteria and are considered candidate neighbors for the purpose of neighbor list seeding.

In step 506, the distance between target cell 606 and each of the candidate cells is calculated and sorted in order of increasing distance. In the example illustrated in FIG. 6, Cell-0, Cell-1, and Cell-2 are all at the same minimum distance of zero and identified as co-site cells in step 508. However, co-site cell locations may have different coordinates due to data rounding or other sources of errors. Accordingly, in an embodiment, when network topology information indicates that two cells are within some threshold distance of one another, such as 10 meters, they are determined to be co-site cells in step 508.

In step 510, antenna boresight azimuth values for co-site cells are determined. In an embodiment, for each operational base station transmitter on each carrier frequency and technology (e.g. 2G, 3G, 4G) identified as a co-site cell, the antenna boresight azimuth associated with that equipment is compared to the antenna boresight azimuth of the target cell and the lowest absolute value difference is taken to be the closest matching cell.

Figure 7:
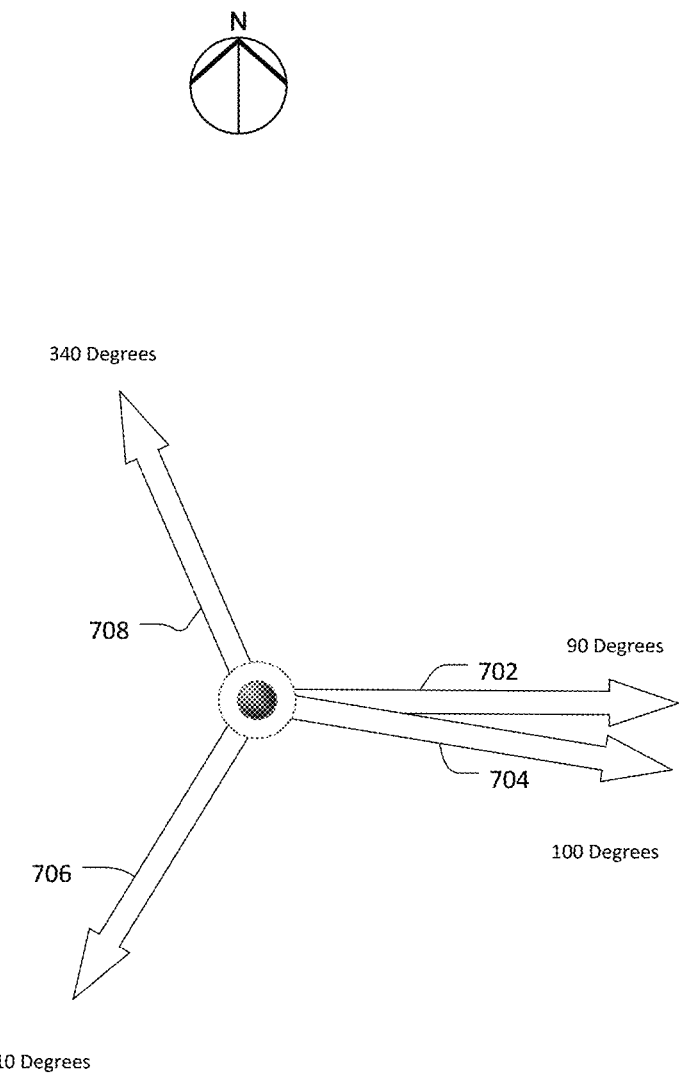
FIG. 7 illustrates determining an azimuth of co-site cells according to an embodiment.

FIG. 7 shows an antenna boresight azimuth 702 of a target cell, while azimuths 704-708 are for cells that are co-sites of the target cell. Azimuth 702 is 90 degrees from north, while azimuth 704 is 100 degrees, azimuth 706 is 210 degrees and azimuth 708 is 340 degrees. Of the three candidate co-site cell azimuth values, the cell associated with an antenna boresight azimuth 704 bearing of 100 degrees represents the closest match. If the cell associated with azimuth 704 is operational and uses a compatible technology, then it is the strongest candidate for designation as a donor cell.

On the other hand, there may be factors that weigh against designating the cell associated with azimuth 704 as the donor cell. For example, the cell may not be operational, or may use a technology that does not employ neighbor lists. In these circumstances, assuming that they are both operational and have compatible technologies, then another co-site cell may be a stronger candidate. In the example of FIG. 7, the cell associated with antenna boresight azimuth 706 deviates from target azimuth 702 by 120 degrees, while azimuth 708 deviates from the target azimuth by 110 degrees. Accordingly, the cell for azimuth 708 may be ranked higher than the cell for azimuth 706.

In step 512, the coverage areas of cells that are not co-site are determined For each cell at a given distance, priority for determining a donor cell is given to cells whose coverage area covers some or all of the coverage area of the target cell. In an embodiment, the overlapping coverage areas between cells may be determined by using an RF coverage prediction tool. In another embodiment, overlapping coverage area may be determined by projecting the candidate cell's antenna boresight azimuth angle towards the target cell and evaluating across an area defined by the candidate cell's antenna half power beamwidth to determine the presence and/or extent of intersection with the coverage area of the target cell. Accordingly, step 512 may include comparing coverage area of the target cell to coverage areas of candidate cells.

Figure 8:
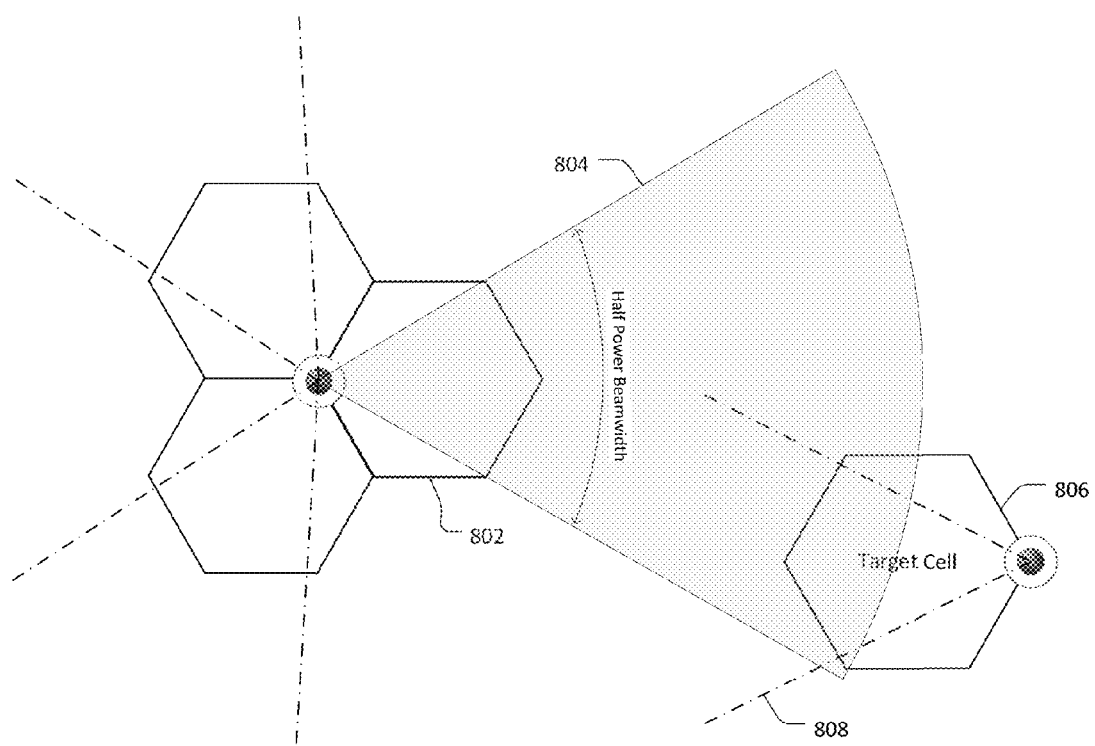
FIG. 8 illustrates coverage area of cells according to an embodiment.

FIG. 8 illustrates a candidate cell 802 with its antenna half power beamwidth 804 shaded in gray extending in the direction of its antenna boresight azimuth and intersecting a portion of the coverage area of the target cell 806. In the embodiment of FIG. 8, the coverage area of target cell 806 is defined by its half-power beamwidth 808. In some embodiments the coverage area of a cell may be further defined by a distance from the associated base station so that the coverage area is bounded by this distance.

In step 514, the technology of candidate cells is determined When designating a donor cell 516, incompatible technologies, such as technologies that do not use a neighbor list, may be rejected as candidates. In an embodiment, a candidate cell with the same technology as the target cell is given precedence over a candidate cell with a different technology for donating a neighbor list to the target cell.

In step 516, one or more donor cell is designated from among the candidate cells. The neighbor list of the one or more donor cell is used as a basis for the initial neighbor list of the target cell. Designating the one or more donor cell includes analyzing information gathered in any of steps 506 to 514 to determine one or more best candidate. Designating one or more donor cell 516 may involve ranking and excluding candidate cells based on the gathered information. For example, as discussed above, a cell is excluded from designation as a donor cell when step 514 determines that the cell uses an incompatible technology, and other cells may be ranked according to the extent to which their coverage areas overlap the coverage area of the target cell.

Examples of designating one or more donor cell will now be given with respect to FIG. 6. In the scenario of FIG. 6, a best match for a donor cell is a cell that is co-site located with the same technology and azimuth that is operating in a different frequency range. However, determining one or more donor cell is more complex when these conditions are not present.

If cell 0 does not currently have operational equipment such as 3G equipment operating on alternate carrier frequencies or alternate technology equipment (e.g. 2G or 4G equipment if the target cell is 3G or vice versa) then cell 0 is excluded and 1 and 2 may be the highest ranked candidates for further investigation. Similarly, if neither of cells 1 and 2 is equipped with operational equipment then cells 6, 7, and 8 would be ranked higher than cells 3 to 5 and 9 to 10 based on distances determined in step 506.

When coverage areas are determined in step 512, it is possible that the coverage area of cell 6 overlaps the coverage area of the target cell more than cells 7 or 8. In this case, cell 6 may be ranked higher than cells 7 or 8. However, even if cell 6 is ranked higher than cell 5 based on distance, it may be the case that the coverage area of cell 5 overlaps the coverage area of the target cell more than cell 6. In such a case, step 516 may balance the variables to designate an appropriate donor cell.

For example, in one embodiment weights are associated with cells in the determination steps. In this example, a closer distance is given a higher weight than a farther distance, and a higher coverage area overlap is given a higher weight than a lower coverage area overlap. The weights may be combined in step 516, and one or more cell with the highest combined weight or highest set of weights is designated as one or more donor cell. In another embodiment, all cells with weights above a certain value are designated as donor cells. Persons of skill in the art will recognize that additional variations of exclusion and ranking to determine one or more donor cell are within the scope of the present invention, and may be adopted to suit a particular embodiment.

Although co-site cells may often be designated as donor cells, exceptions are possible. For example, when a base station is installed at a new cell site, none of the co-site cells may have a neighbor list, so they are not available as donor cells. In another example, a base station does not have a co-site cell with an azimuth that is similar to the azimuth of a newly added cell, but coverage area of the newly added cell shares a large amount of overlap with coverage area of a cell at another cell-site. In this example, the overlapping neighbor cell may be ranked as a better candidate for donating its neighbor list to the target cell than the co-site cells.

In some embodiments, more than one donor cell is designated. In such embodiments, the neighbor list transmitted to the target cell may be a combination of neighbor lists of the more than one donor cell. For example, neighbor lists of multiple donor cells may be compared, and entries that are common to more than one neighbor list are used to create the neighbor list of the target cell. In another embodiment, neighbor lists of donor cells are concatenated to create a neighbor list for the target cell.

Figure 9:
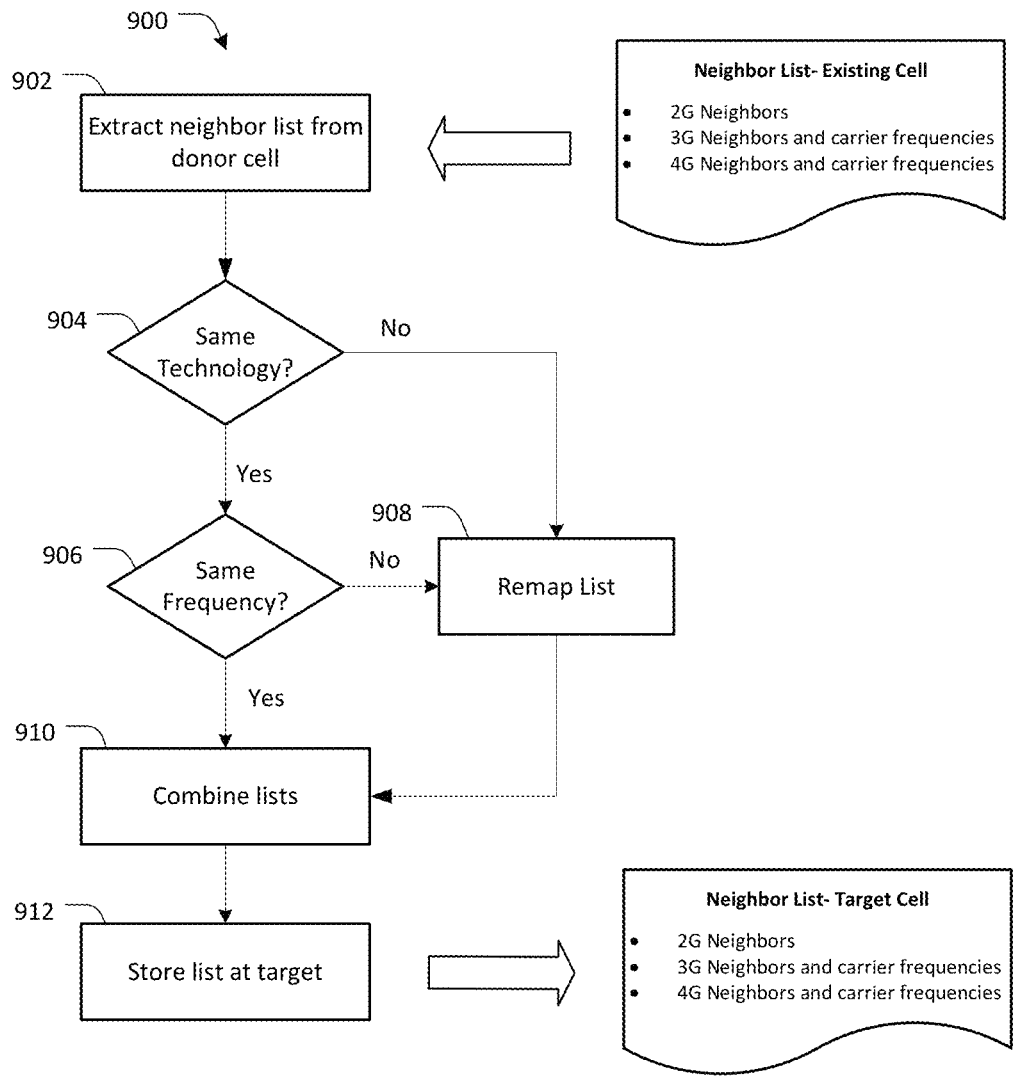
FIG. 9 illustrates a process for creating a neighbor list for a target cell according to an embodiment.

FIG. 9 shows a process 900 of creating a neighbor list for the target cell, which includes transferring neighbor list information from one or more donor cell to the target cell. Aspects of process 900 correspond to step 410 of FIG. 4. In step 902, a neighbor list is extracted from each donor cell designated in step 516. If multiple donor cells are designated, step 902 includes extracting neighbor lists from all donor cells. The cells may be extracted by and stored at a computing device coupled to a backhaul portion of the network such as an NRC.

In step 904, the technology of a donor cell is compared to the technology of the target cell. If the technology is different, then the list is remapped in step 908. If the technology is the same, then the carrier frequencies of the target cell are compared to the carrier frequencies of the donor cell. If the carrier frequencies are different, then the neighbor list is remapped in process 908, while if they are the same then the neighbor list is not remapped.

Figure 10A:
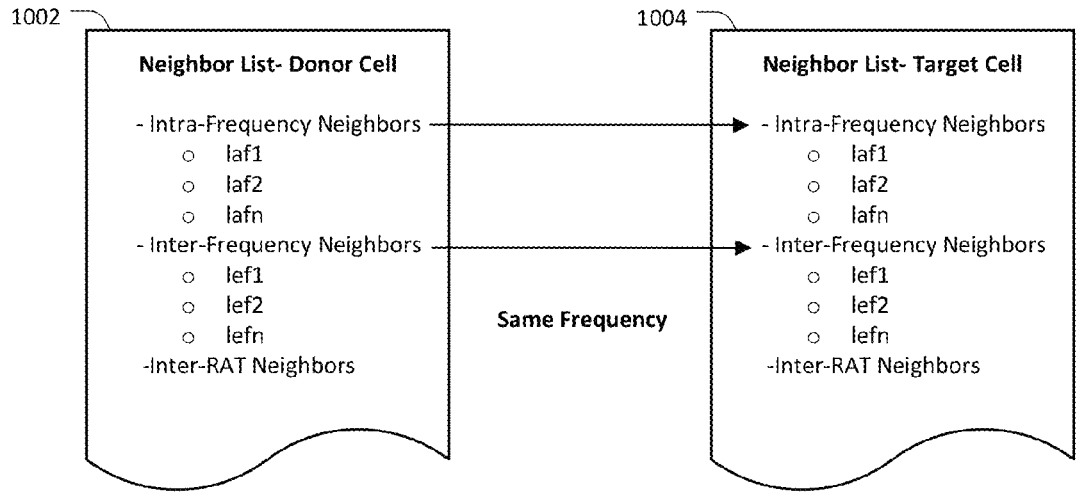
FIG. 10A illustrates transferring a neighbor list without remapping according to an embodiment.

FIG. 10A shows a UMTS (3G) donor cell's neighbor list 1002 being transferred to a UMTS (3G) target cell. In the example of FIG. 10A, the donor cell uses the same technology and carrier frequencies, so the neighbor list is not re-mapped when it is transferred to become neighbor list 1004.

Figure 10B:
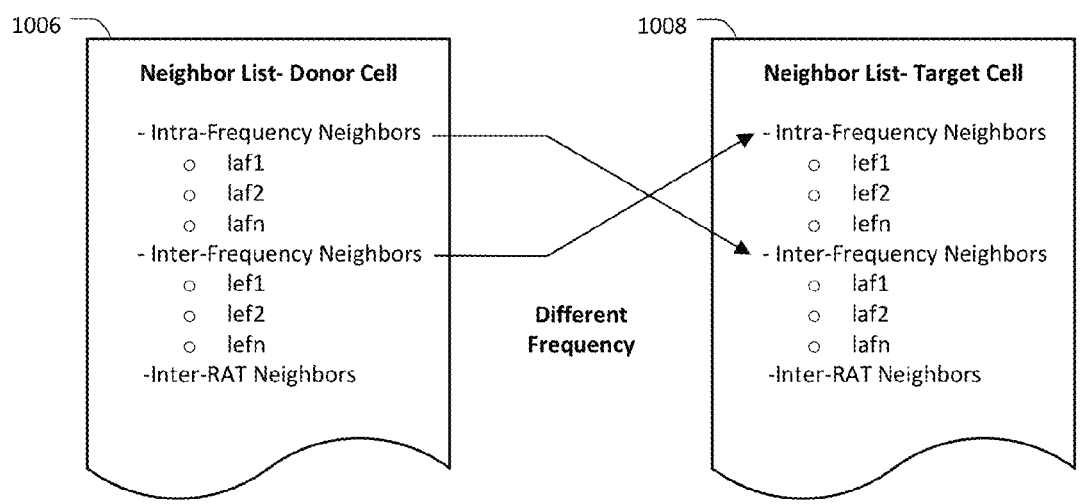
FIG. 10B illustrates transferring and remapping a neighbor list according to an embodiment.

FIG. 10B shows an example of remapping a neighbor list. In FIG. 10B, the donor cell uses a different carrier frequency than the target cell. Accordingly, some or all of the intra-frequency neighbors (3G soft handover neighbors) on the neighbor list 1006 of the donor cell are remapped as inter-frequency neighbors (3G hard handover neighbors) in the target cell neighbor list 1008. The inter-frequency neighbors of the donor cell's neighbor list that have the same carrier frequency as the target cell are remapped as intra-frequency neighbors for the target cell. The inter-frequency neighbors of the donor cell's neighbor list that have a different carrier frequency to the target cell may be remapped as inter-frequency neighbors in the target cell neighbor list 1008. Although the examples shown in FIGS. 10A and 10B are for UMTS, similar modifications may be conducted when transferring a neighbor list from a donor to a target in other technologies as well.

Returning to FIG. 9, in an embodiment in which multiple donor cells have been designated, the lists are combined in step 910. Combining lists may include identifying common neighbors between multiple lists and adding the common neighbors to the target cell's neighbor list, combining all entries to create a single combined neighbor list, or other methods. Step 910 may not be performed when a single donor cell is designated. In step 912, the neighbor list is stored in a memory of the base station associated with the target cell.

In an embodiment, identifying a donor cell may be based on geographic proximity as well as similarity in coverage areas between a target cell and candidate donor cells as well as similarities in radio access technology between the target cell and candidate donor cells. In some embodiments, highest preference is given to existing co-sector (i.e. co-site and utilizing the same or similar antenna boresight azimuth pointing angles to provide similar geographic coverage area support) cells employing the same radio access technology (e.g. 2G, 3G, 4G) but operating on different carrier frequencies or in different band segments. However, in some circumstances, the donor cell may be determined based on technology, location, azimuth, and coverage area.

Creating a new neighbor list in the target cell may involve reading the existing neighbor list from the donor cell and remapping individual list entries as necessary prior to automatically pushing this neighbor list to the target cell. If the donor cell is of the same radio access technology type and operates on the same carrier frequency, which may be the case for non co-sector or non co-site donor cells, the list remapping is minimal In the case of co-sector donor cells that will not, in general operate on the same carrier frequency more extensive list remapping may be performed.

Although aspects of the present invention have been described with respect to specific examples, embodiments of the present invention are not limited by these examples. For example, persons of skill in the art will recognize that determining one or more donor cell may be performed according to various algorithms without departing from the scope or spirit of the present invention.

What is claimed is:

1. A system for initializing a neighbor list for a target cell, the system comprising:
   a processor;
   a memory; and
   a non-transitory computer readable medium with computer executable instructions stored thereon which, when executed by the processor, perform the following steps:
   determining one or more donor cell from among a plurality of candidate cells; and
   creating a neighbor list for the target cell based on one or more neighbor list of the one or more donor cell,
   wherein creating the neighbor list for the target cell comprises:
      determining whether the one or more donor cell uses a same carrier frequency as the target cell;
      when the one or more donor cell uses a different carrier frequency from the target cell, remapping contents of the one or more neighbor list of the one or more donor cell in accordance with the technology of the target cell; and
      choosing a co-site located cell with a closest boresight azimuth to the target cell from among a plurality of co-site located cells as the donor cell.

2. The system of claim 1, wherein determining the one or more donor cell comprises:
   defining a geographical area based on the location of the target cell; and
   designating a plurality of cells within the geographical area as candidate cells.

3. The system of claim 1, wherein determining the one or more donor cell comprises:
   determining coverage areas of the plurality of candidate cells; and
   comparing the coverage areas of the plurality of candidate cells to a coverage area of the target cell.

4. The system of claim 1, wherein determining the one or more donor cell comprises:
   comparing communications technology of each of the plurality of candidate cells to a communication technology of the target cell.

5. The system of claim 1, wherein creating the neighbor list for the target cell further comprises:
   determining whether the one or more donor cell uses a same communications technology as the target cell; and
   when the one or more donor cell uses a different communications technology from the target cell, remapping contents of the donor cell's neighbor list in accordance with the communications technology of the target cell.

6. The system of claim 1, wherein remapping the contents of the one or more neighbor list of the one or more donor cell includes re-mapping data for inter-cell neighbors with data for intra-cell neighbors.

7. The system of claim 1, wherein the one or more donor cell includes a plurality of cells, and
   wherein creating the neighbor list for the target cell includes combining information from each neighbor list of the plurality of donor cells.

8. The system of claim 1, wherein determining the one or more donor cell comprises:
   defining a geographical area based on the location of the target cell;
   designating a plurality of cells within the geographical area as candidate cells;
   determining coverage areas of the plurality of candidate cells;
   comparing the coverage areas of the plurality of candidate cells to a coverage area of the target cell; and
   comparing communications technology of each of the plurality of candidate cells to a communication technology of the target cell.

9. The system of claim 1, wherein determining the one or more donor cell and creating the neighbor list for the target cell are performed when the system detects that a new cell is added to the system, when the target cell is repurposed to use a different set of frequencies, or when the coverage area of the target cell is changed.

10. A method for initializing a neighbor list for a target cell, the method comprising:
    determining one or more donor cell from among a plurality of candidate cells; and
    creating a neighbor list for the target cell based on one or more neighbor list of the one or more donor cell,
    wherein creating the neighbor list for the target cell comprises:
       determining whether the one or more donor cell uses a same carrier frequency as the target cell;
       when the one or more donor cell uses a different carrier frequency from the target cell, remapping contents of the one or more neighbor list of the one or more donor cell in accordance with the carrier frequency of the target; and
       choosing a co-site located cell with a closest boresight azimuth to the target cell from among a plurality of co-site located cells as the donor cell.

11. The method of claim 10, wherein determining the one or more donor cell comprises:
    defining a geographical area based on the location of the target cell; and
    designating a plurality of cells within the geographical area as candidate cells.

12. The method of claim 10, wherein determining the one or more donor cell comprises:
    determining coverage areas of the plurality of candidate cells; and
    comparing the coverage areas of the plurality of candidate cells to a coverage area of the target cell.

13. The method of claim 10, wherein determining the one or more donor cell comprises:
   comparing communications technology of each of the plurality of candidate cells to a communication technology of the target cell.

14. The method of claim 10, wherein creating the neighbor list for the target cell further comprises:
   determining whether the one or more donor cell uses a same communications technology as the target cell; and
   when the one or more donor cell uses a different communications technology from the target cell, remapping contents of the donor cell's neighbor list in accordance with the communications technology of the target cell.

15. The method of claim 10, wherein remapping the contents of the one or more neighbor list of the one or more donor cell includes re-mapping data for inter-cell neighbors with data for intra-cell neighbors.

16. The method of claim 10, wherein the one or more donor cell includes a plurality of cells, and
   wherein creating the neighbor list for the target cell includes combining information from each neighbor list of the plurality of donor cells.

17. The method of claim 10, wherein determining the one or more donor cell comprises:
   defining a geographical area based on the location of the target cell;
   designating a plurality of cells within the geographical area as candidate cells;
   determining coverage areas of the plurality of candidate cells;
   comparing the coverage areas of the plurality of candidate cells to a coverage area of the target cell; and
   comparing communications technology of each of the plurality of candidate cells to a communication technology of the target cell.

18. The method of claim 10, wherein determining the one or more donor cell and creating the neighbor list for the target cell are performed when the system detects that a new cell is added to the system, when the target cell is repurposed to use a different set of frequencies, or when the coverage area of the target cell is changed.

19. A non-transitory computer readable medium with computer executable instructions stored thereon which, when executed by a processor, perform the following steps:
   designating a target cell that does not have a neighbor list;
   determining one or more donor cell from among a plurality of candidate cells; and
   creating a neighbor list for the target cell based on one or more neighbor list of the one or more donor cell,
   wherein creating the neighbor list for the target cell comprises:
      determining whether the one or more donor cell uses a same carrier frequency as the target cell;
      when the one or more donor cell uses a different carrier frequency from the target cell, remapping contents of the one or more neighbor list of the one or more donor cell in accordance with the carrier frequency of the target cell; and
      choosing a co-site located cell with a closest boresight azimuth to the target cell from among a plurality of co-site located cells as the donor cell.

* * * * *